Sept. 6, 1966 P. S. CASTRO ETAL 3,271,665
THIN FILM FIELD SENSOR
Filed Nov. 20, 1963 2 Sheets-Sheet 1

INVENTORS.
PETER S. CASTRO
FRANK F. STUCKI
BY
George C. Sullivan
Agent

Sept. 6, 1966 P. S. CASTRO ETAL 3,271,665
THIN FILM FIELD SENSOR
Filed Nov. 20, 1963 2 Sheets-Sheet 2

EASY AXIS

HARD AXIS

INVENTORS.
PETER S. CASTRO
FRANK F. STUCKI
BY
Agent

United States Patent Office 3,271,665
Patented Sept. 6, 1966

3,271,665
THIN FILM FIELD SENSOR
Peter S. Castro and Frank F. Stucki, Palo Alto, Calif., assignors to Lockheed Aircraft Corporation, Burbank, Calif.
Filed Nov. 20, 1963, Ser. No. 324,993
6 Claims. (Cl. 324—43)

This invention relates to an improved thin film field sensor and more particularly to an improved magnetic field sensor having a single domain thin film of uniaxial anisotropy whereby the magnitude and direction of external magnetic fields may be determined.

In the prior art, thin magnetic films have been employed in magnetic memory film elements in the form of thin magnetic layers of approximately several thousand angstroms thick for use in computer applications. Such films have been prepared in the past by deposition of a ferromagnetic material, as for example, an 80%–20% by weight alloy of nickel-iron, called "Permalloy," on a suitable substrate member. When such films are formed in the presence of an externally applied magnetic field directed parallel to the plane of the film, the resultant element is observed to have significant uniaxial anisotropy properties. In particular, the magnetization vector aligns itself in a preferred orientation in a direction in the plane of the film, termed the "easy axis of magnetization." The extent to which the film is oriented in the easy direction is determined by the anisotropy constant and the corresponding anisotropy energy of the material. Such films are characterized as "bistable" in that they may be induced to switch from one stable state of magnetization along the easy axis to another stable state of reversed magnetization through the application of a magnetic field of sufficient magnitude to exceed the coercive force of the material.

It has been generally understood and accepted by those skilled in the prior art, that once such bistable thin films have been induced to switch from one stable state of magnetization along the easy axis to another stable state of reversed magnetization, it is virtually impossible to effect, to any substantial extent, a change in the stable state orientation of the magnetization vector by subjecting the film to an external field at right angle to the easy axis, termed the "hard axis." Thus, heretofore, a void in the prior art has existed in that it was believed to be extremely difficult, if not impossible, to build a device which utilized the uniaxial anisotropy of a thin magnetic film to sense the presence and magnitude of the magnetic field directed along the hard axis of the film as the magnetic vector of the film was being switched about the easy axis by a driving magnetic field directed along the easy axis.

An object of the invention is to provide an improved magnetic sensing device for detecting external magnetic fields.

Another object of the present invention is to provide an improved magnetic sensing device having square hysteresis loop characteristics for detecting the direction and magnitude of external magnetic fields.

A further object of the present invention is to provide a thin film magnetic sensing device having square hysteresis loop characteristics for detecting the presence and magnitude of external magnetic fields directed at right angles to a fluctuating magnetic field applied along an easy axis of the magnetic field utilized.

Still another object of this invention is to provide an improved magnetic sensing device utilizing a thin magnetic film having square hysteresis loop characteristics for detecting the magnitude of external magnetic fields which is directly proportional to the voltage output of the device.

The novel features which are believed to be characteristic of the invention both as to its organization and method of construction and operation, together with further objects and advantages thereof, will be better understood from the following description considered in connection with the accompanying drawings in which illustrative embodiments of the invention are disclosed by way of example.

It is expressly understood, however, that the drawings are for purposes of illustration and description only and do not define limitations of the invention.

The present invention is based upon the discovery that a uniaxial anisotropic single domain film, with its magnetization vector oriented along the easy axis, may be switched thereabout by a sinusoidal varying magnetic field as a mode of excitation to provide a magnetically sensitive element capable of detecting the magnitude of an external magnetic field which is applied at right angles to the magnetic excitation field. The complete theory explaining all of the salient features of the discovery is not yet known. However, many of the salient operational features of the magnetic sensing device encompassing this discovery have been investigated, and the results thereof demonstrate the new and useful features thereof.

According to the practice of the present invention, the single domain anisotropic magnetic films utilized may be produced by vacuum evaporation of suitable magnetic material onto an insulative substrate member. The thin magnetic film is applied to the substrate member while an applied magnetic field is directed parallel to the plane of the film, along the easy axis of magnetization. Thereafter, the film is annealed at an elevated temperature of about 200° C. for a preselected period of time; for example, about 45 minutes. The resultant film retains its uniaxial anisotropic properties but is relieved of mechanical stresses.

Figure 1:
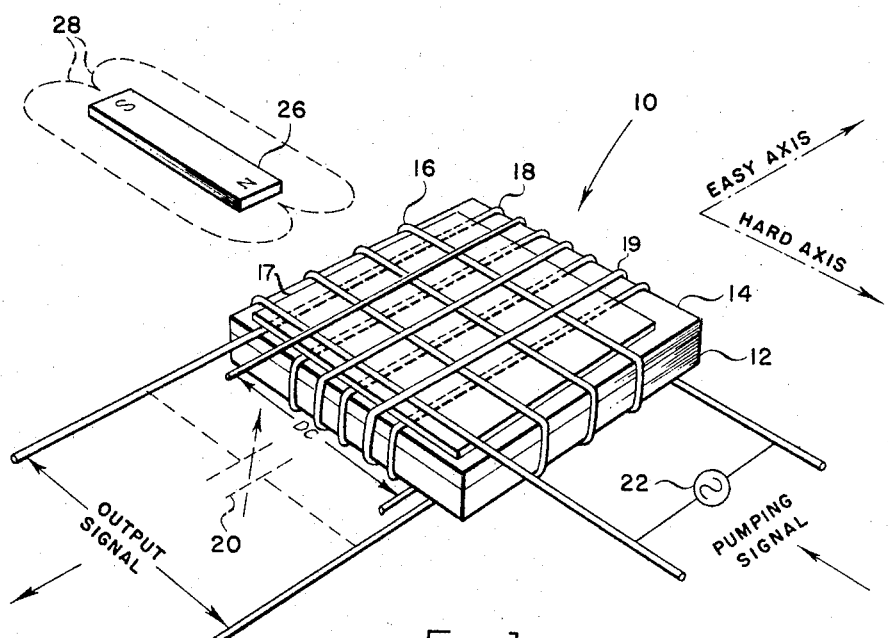
FIGURE 1 is a perspective view of a thin magnetic film sensing element illustrating the orientation of a sensing and pumping coil with respect to the easy and hard axes of the thin film utilized.

Referring now to the drawings wherein like reference characters designate like or corresponding parts through several views, there is shown in FIGURE 1 a thin magnetic film sensing element 10 which comprises an insulative substrate 12 as a support member, a thin magnetic film 14 which is single domain, such as Permalloy, for example, deposited on the substrate 12, and a pair of mutually perpendicular coils 16 and 18 wound on the substrate containing the thin film. It should be noted at this point that the film material utilized for this invention may be any suitable type which has the magnetic anisotropy properties considered here. As shown in FIGURE 1, the input signal source pumping coil 16 is wound so that its axis is parallel to the easy axis of the thin film and is hereinafter referred to as the pumping coil, while the output source sensing coil 18 is wound so that its axis is perpendicular to the easy axis and is hereinafter referred to as the sensing coil. It should be noted at this point that in a practical working device according to the invention, the sensing and pumping coils are separated by an electrostatic shield 17 to eliminate intercoil capacitance coupling and inductance cross-effects and the like. This type of shield is discussed in detail hereinbelow. It is understood that operation of the device will depend upon the use of such a shield and it is considered a part of the inventive combination.

A variable capacitor 20 may be connected in parallel with the sensing coil 18 as shown in the illustrated embodiment, or in series therewith in order to establish a mechanism for controlling the resonance frequency of the combination. In some applications, however, it may not be desirable to employ a lumped capacitance and the distributed capacitance of the sensing coil 18 may be sufficient to provide the desired resonant frequency for the coil. The purpose of the capacitance is to provide a way for adjusting or determining the frequency of the sensing coil so that it operates at an even harmonic which is desirable in accordance with the present invention and will be discussed in greater detail hereinafter.

In FIGURE 1, the illustrative embodiment of the invention, only a few turns are shown; however, in practice it has been found that about 100 turns for each coil is appropriate to provide the ampere turns required for satisfactory operation of the device. A suitable alternating current source 22 is connected across pumping coil 16 to provide a magnetic field along the easy axis of the film to thereby cause the magnetic vector of the anisotropy film to switch or rotate through 360° during each cycle of the pumping signal.

Figure 2:
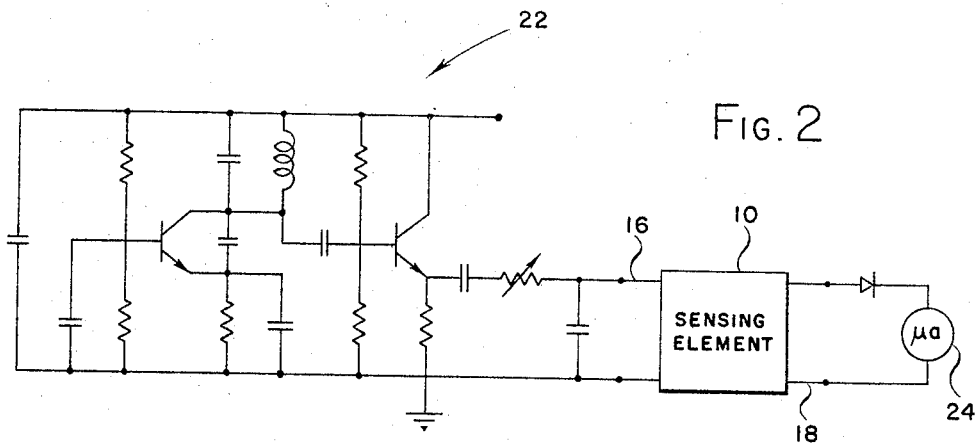
FIGURE 2 is a schematic diagram illustrating the embodiment of the invention utilizing an improved thin film magneitc film sensing element.

With reference to FIGURE 2, there is shown an embodiment of the invention wherein the sensing element 10 is utilized as a magnetometer to detect the presence and magnitude of an external magnetic force. As shown in the drawing, the input terminals of sensing coil 16 are connected to the pumping signal source 22 comprising a transistorized Colpitts oscillator driving an emitter-follower which in turn supplies the pumping current for the sensing element 10. The output voltage is taken from the terminals of the sensing coil 18 and is rectified and used to drive a 0–50 microampere meter 24 which indicates only the magnitude of an applied external field along the hard axis of the sensing element. The circuit for the pumping signal source 22 is conventional, being suitable for many applications; however, it should not be construed as a limitation on the invention, inasmuch as many such circuits may be applicable to the disclosed combination.

Further discussion of several salient features of the invention will be given in connection with the operation of the device.

Referring again to FIGURE 1, there is shown an external magnetic field represented by a bar magnet 26 having magnetic field lines generally designated 28 which are directed along the hard axis of the thin film 14 of sensing element 10. Utilization of the magnetic sensing element 10 in accordance with the present invention is commenced by exciting the pumping coil 16 with the pumping signal source 22 which may typically generate a three megacycle signal having a 12 volt peak-to-peak amplitude, the fundamental resonant frequency of the pumping coil 16. As the pumping signal goes through each cycle, the magnetic field generated by the coil 16 reaches a maximum in one direction then reverses itself and reaches another maximum in the opposite direction. As the magnetic field generated by the pumping coil builds up it is sufficiently high to overcome the coercive forces of the thin film, which in turn causes the magnetic vector of the film to reverse itself during each half cycle. A more detailed discussion of the coercive forces and the square loop properties of the film will be discussed hereinbelow with reference to FIGURES 3 and 4.

In operation, the only output that appears across the sensing coil in the absence of an external magnetic field directed along the hard axis of the film is that of a positive spike during the first half of each cycle and a negative spike during the second half of each cycle. However, whenever the sensing element 10 is placed in an external magnetic field, the axis thereof directed parallel to the hard axis of the thin film, a voltage is generated in the sensing coil which is directly proportional to the magnitude of the external field, such as that illustrated by magnet 26, and will be in the form of a sine wave similar to that of the resonant frequency of the input signal from the pumping signal source 22.

Figure 3:
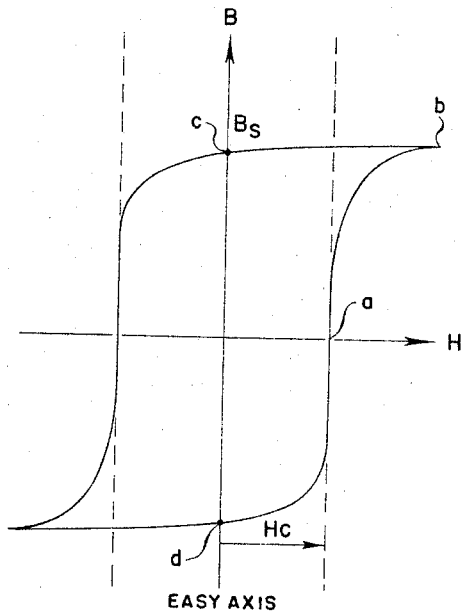
FIGURES 3 and 4 are reproductions of ideal hysteresis loops for a thin magnetic film of single domain illustrating the easy and hard axis characteristics, respectively.
Figure 4:
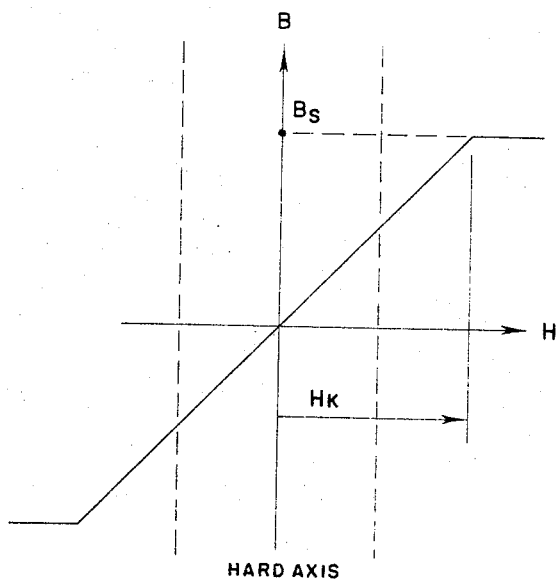

A more comprehensive understanding of the operating characteristics of the sensing element 10 may be obtained by reference to FIGURES 3 and 4. FIGURE 3 illustrates an ideal hysteresis loop for a single domain anisotropy film depicting its square loop properties along the easy axis. FIGURE 4 illustrates a plot of the ideal hysteresis characteristics along the hard axis. The quantity $H_c$ measured along the H axis of FIGURE 3 is called the coercive force or threshold of the film and is the magnitude of magnetic force required to switch the magnetic vector of the film from one direction to another along the easy axis, while the quantity $B_s$ is called the saturation field which determines the upper limit for flux or current saturation of the film. Orientation of the magnetic vector of the thin film is commenced when the magnetic field intensity (H) reaches the threshold value $H_c$. As the current of the energizing systems increases from zero to some desired maximum value, both the field intensity (H) and the flux density (B) will increase to point $b$ on the curve. As the current decreases the magnetization curve does not retrace this portion of the curve. When the current has been reduced to zero there will be some residual flux in the film, as indicated at point $c$, called the positive remanent saturation point. The foregoing cycle is repeated each cycle of the pumping signal source 22. In contrast to the trace of the curve of FIGURE 3, FIGURE 4 does not have remanent saturation points, so that the magnetization curve retraces each quarter cycle and there is a linear relationship between (H) and (B) before saturation ($B_s$).

From the foregoing discussion it can be seen that the application of a magnetic field along the hard axis does not have the same effect as the same magnetic field would have if directed along the easy axis. This observation in part explains why the magnetic field detected by the sensing element 10 along its hard axis produces a voltage in the sensing coil which is proportional to the field being measured. In addition, it can be concluded from FIGURE 4 that it is virtually impossible to switch the magnetic vector by pumping along the hard axis, nor is it possible to determine whether the magnetic vector of the film is aligned in its preferred orientation.

The sensing element 10 may be operated in several modes depending upon the application. When the pumping coil 16 and sensing coil 18 are operated in the fundamental mode (that is, both coils at the same frequency), good linearity is obtained up to about 2.5 oersteds, with a sensitivity of about 0.8 volt per oersted. However, the sensitivity at the fundamental mode may be increased by increasing the pumping voltage. Thus, there is an apparent linear relationship between the sensitivity and the pumping voltage.

It has been found that during the operation of the sensing element 10 at even harmonics, for example, where the resonant frequency of the sensing coils 18 is two, four, and the like, times the frequency of the pumping voltage, the sensitivity of the sensing element 10 is substantially enhanced. For example, sensitivities as large as 250 volts per oersted have been obtained when operating at the fourth harmonic. However, the device commences to saturate at the low level of about 0.02 oersted. This leads to the conclusion that even modes of operation are extremely sensitive, and must be utilized to measure weaker magnetic fields.

In accordance with another embodiment of the invention, the difficulties of irreversible domain wall motion encountered with large applied magnetic fields causing hysteresis and backlash of the output voltage may be avoided through the use of a third coil 19 carrying a direct current in such a manner that the axis of the third coil is parallel to the axis of the sensing coil, thereby to diminish the applied field and to reduce the net field acting on the film of the sensing element 10 to a value within its reversible range. In this manner the magnitude and direction of the direct current of the third coil, instead of the induced voltage of the sensing coil 16, is monitored to provide a measure of the applied fields of different levels. Thus, it can be seen that the more sensitive even harmonic modes add to the versatility of the invention.

Some of the advantages and further details of the invention will be given by way of discussion of a sample device. A typical sensing element 10 may be constructed with 120 turns of number 38 double enamel covered copper wire as the pumping coil 16, wound on a glass substrate 12 measuring 0.7 inch by 0.7 inch by 0.003 inch with a Permalloy single domain film 14 of about 1700 A. thick deposited thereon so that the axis thereof is along the easy axis of the film; an electrostatic shield formed from 44 pieces of 1¾ inch long number 29 double enamel covered copper wire having a "U-shaped" configuration, is placed about the pumping coil 16 so that the open ends of the U are parallel to the hard axis of the film, 130 turns of number 38 double enamel covered copper wire are wound perpendicular to the axis of the pumping coil 18 over the electrostatic shield to form the sensing coil 18. The center conductor of a five foot length of RG 58 C/U cable is connected to one end of the pumping coil 16, and BNC cable connector number UG–89C/C is connected to the free end of this cable, the center conductor of a second five foot length of RG 58 C/U cable is also connected to one end of the sensing coil 18, and a BNC cable connector number UG–89C/U is connected to the free end of this second cable. The shield leads of these two cables are connected to the free ends of the "U-shaped" electrostatic shield along with the free ends of the pumping and sensing coils which are in turn attached to a ground connection. The sensing element in its entirety is coated with an epoxy material.

The following is a typical example of the operation of the sensing element 10 wherein the pumping signal source 22 is at 390 kc. and the reading measured by ampere meter 24 as illustrated in FIGURE 2 is that derived from a voltage having an output frequency of 1.55 megacycles. A sensitivity of 250 volts per oersted when pumped with 11.3 volts peak-to-peak was obtained. The coercive force of the film 14 was measured at 2.6 oersted and the saturation flux was 0.34 maxwell. Spatial field responses of sensing element 10 were measured in the $x$–$y$ and $x$–$z$ planes and they were found to follow a cosine $\theta$ law, while no response was found in the $y$–$z$ plane. The $x$ and $y$ axes were in the horizontal direction while the $z$ axis was in the vertical direction. The spatial response of the device is apparently that of two tangent spheres with a maximum response in the hard direction. Thus, the sensing element 10 responds only to the component of the applied magnetic field parallel to the hard direction.

In closing, it is useful to summarize some of the advantages of the present invention. One such advantage involves the use of thin magnetic films, such as, for example, Permalloy, to detect external magnetic fields which are rather economical to build, light in weight, small in size, and rugged and simple in construction. Coextensive with these physical and economical advantages, the device has the electrical advantage of unusual sensitivity which is much greater than any device heretofore known having all of the physical attributes of the present invention.

It is to be expressly understood that the above-described embodiments are only illustrative of the principles applicable in the invention. Numerous other arrangements and modifications may be defined by those skilled in the art without departing from the spirit and scope of the invention. Accordingly, the present invention is limited only by the spirit and scope of the appended claims.

What is claimed is:

1. An improved flux sensing device for measuring the magnitude of external magnetic fields comprising: an insulative support member; a thin bistable magnetic film deposited on said support member, said film having easy and hard axes of magnetization perpendicular to one another and having square hysteresis loop characteristics along the easy axis; means including a first coil wound about said film and said support member for switching the magnetic vector of said thin magnetic film about said easy axis; and means including a second coil for detecting and recording the magnitude of an external magnetic field directed along the axis of said second coil and the hard axis of said thin magnetic film.

2. The improved flux sensing device defined in claim 1 which further includes a third coil wound about said first and second coils and having its axis parallel to said second coil, said third coil having a direct current source applied thereto to thereby reduce the net field acting on said thin magnetic film and to provide means for measuring the magnitude of an externally applied magnetic field.

3. An improved flux sensing device for measuring the magnitude of external magnetic fields comprising: an insulative support member; a thin magnetic film deposited on said support member, said film having an easy axis of magnetization perpendicular to a hard axis of magnetization; a first coil having an axis, said first coil is wound about said film and said support member for generating a magnetic field whose axis is along the axis of said first coil and parallel to the easy axis of said thin magnetic film; an electrostatic shield covering said first coil; a second coil wound about said electrostatic shield and having axis which is parallel to the hard axis of said magnetic field; a signal source connected to said first coil for switching the magnetization vector of said thin magnetic film about said easy axis; and a rectifier circuit and signal measuring meter connected in series to said second coil for recording the magnitude of an external magnetic field sensed by the device.

4. An improved thin film magnetic flux sensor comprising a thin magnetic film deposited on an insulative support member, said magnetic film having easy and hard axes of magnetization perpendicular to one another, a pumping coil wound about said magnetic film and support member, such that the axis of said coil is parallel to the easy axis of said thin magnetic film, a sensing coil wound about said pumping coil with an electrostatic shield therebetween to eliminate inter-coil capacitance coupling and inductance cross effects, said sensing coil forming an axis along the hard axis of said thin magnetic film and having a resonant frequency which is a even harmonic of a signal applied to the pumping coil which is utilized to switch the magnetic vector of said thin magnetic film to thereby enable said sensing coil to sense a voltage generated therein which is directly proportional to the magnitude of the external field being measured.

5. An improved magnetic flux sensing device comprising: a thin single domain anisotropy magnetic film deposited on a planar insulative support member, said thin film having in said plane of said film a magnetization vector oriented along an easy axis thereof and having a hard axis in said plane perpendicular to said easy axis, magnetic varying means for switching said magnetization vector of said thin film about said easy axis in said plane, second means for sensing a change in the net magnetic flux resulting from an application of a magnetic film generated by said magnetic means and an external magnetic field being measured by said device to thereby produce a signal proportional to said external magnetic field, and signal conditioning means for converting said signal to a voltage and for recording the magnitude of said external magnetic field as represented by said signal.

6. An improved flux sensing device for measuring the magnitude of external magnetic fields comprising: a substantially non-magnetic support member; a thin bistable magnetic film deposited on said support member, said film having easy and hard axes of magnetization perpendicular to one another and having substantially square hysteresis loop characteristics along the easy axis; means including a first coil wound about said film and said support member for switching the magnetic vector of said thin magnetic film about said easy axis; and means including a second coil for detecting and recording the magnitude of an external magnetic field directed along the axis of said second coil and the hard axis of said thin magnetic film.

References Cited by the Examiner

IBM Technical Disclosure Bulletin, "Magnetic Field Measurement," by S. Middelhoek, vol. 4, No. 6, November 1961. Pages 42 and 43.

RICHARD B. WILKINSON, *Primary Examiner.*